United States Patent
Suciu et al.

(10) Patent No.: US 8,490,410 B2
(45) Date of Patent: *Jul. 23, 2013

(54) AXIAL ACCESSORY GEARBOX

(75) Inventors: Gabriel L. Suciu, Glastonbury, CT (US); Christopher M. Dye, Glastonbury, CT (US); Hung Duong, Unionville, CT (US); Nathan Snape, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 95 days.

This patent is subject to a terminal disclaimer.

(21) Appl. No.: 12/948,051

(22) Filed: Nov. 17, 2010

(65) Prior Publication Data

US 2012/0117981 A1    May 17, 2012

(51) Int. Cl.
 *F02C 7/275* (2006.01)
(52) U.S. Cl.
 USPC .............................. 60/802; 60/788
(58) Field of Classification Search
 USPC .......................... 60/802, 788, 786
 See application file for complete search history.

(56) References Cited

U.S. PATENT DOCUMENTS

| | | | |
|---|---|---|---|
| 2,803,943 A | 8/1957 | Rainbow | |
| 2,978,869 A * | 4/1961 | Hiscock et al. | 60/802 |
| 3,455,182 A | 7/1969 | Kelley | |
| 3,714,779 A | 2/1973 | Stein et al. | |
| 4,437,627 A | 3/1984 | Moorehead | |
| 4,525,995 A | 7/1985 | Clark | |
| 5,233,886 A * | 8/1993 | Bossler, Jr. | 74/665 F |
| 5,410,870 A | 5/1995 | Brault et al. | |
| 5,687,561 A | 11/1997 | Newton | |
| 6,357,220 B1 | 3/2002 | Snyder et al. | |
| 6,364,249 B1 | 4/2002 | Morgan et al. | |
| 6,851,267 B2 | 2/2005 | Bruno et al. | |
| 7,500,365 B2 | 3/2009 | Suciu et al. | |
| 2002/0084120 A1 | 7/2002 | Beasley | |
| 2005/0150204 A1 | 7/2005 | Stretton et al. | |
| 2009/0188334 A1 | 7/2009 | Merry et al. | |
| 2009/0236469 A1 | 9/2009 | Suciu et al. | |
| 2009/0290976 A1 | 11/2009 | Suciu et al. | |
| 2010/0107650 A1 | 5/2010 | Ress, Jr. et al. | |
| 2012/0117982 A1 * | 5/2012 | Suciu et al. | 60/802 |

FOREIGN PATENT DOCUMENTS

| | | |
|---|---|---|
| EP | 2216530 | 2/2010 |
| EP | 2372129 | 3/2010 |
| EP | 2390486 | 5/2011 |
| EP | 2405116 | 6/2011 |
| EP | 2455597 | 11/2011 |
| GB | 626036 | 7/1949 |
| GB | 628496 | 8/1949 |
| GB | 717679 | 11/1954 |

OTHER PUBLICATIONS

Partial European Search Report, Sep. 21, 2012 for EP 1118897.
European Search Report, Sep. 21, 2012 for EP12167176.

* cited by examiner

*Primary Examiner* — Phutthiwat Wongwian
*Assistant Examiner* — Vikansha Dwivedi
(74) *Attorney, Agent, or Firm* — Carlson, Gaskey & Olds PC (57) ABSTRACT

An accessory system for a gas turbine engine includes an accessory gearbox which defines an accessory gearbox axis. A crossover gear set generally along the accessory gearbox axis interconnects a first gear set and a second gear set.

21 Claims, 10 Drawing Sheets

AXIAL ACCESSORY GEARBOX

BACKGROUND

The present disclosure relates to a gas turbine engine, and more particularly to an accessory gearbox therefor.

Aircraft powered by gas turbine engines often include a mechanically driven accessory gearbox to drive accessory systems such as fuel pumps, scavenge pumps, electrical generators, hydraulic pumps, etc. These components typically operate at different speeds from one another and require differing amounts of horsepower as provided by the accessory gearbox.

Conventional gas turbine engine accessory gearboxes utilize a gearbox case mountable underneath the engine. The gearbox case is typically crescent-shaped with forward and aft faces to which the accessory components are mounted. The accessory gearbox is driven by an angle gearbox through a layshaft which axially extends from the gearbox case. A towershaft driven by the engine high-pressure spool drives the layshaft through the angle gearbox.

SUMMARY

An accessory system for a gas turbine engine according to an exemplary aspect of the present disclosure includes an accessory gearbox which defines an accessory gearbox axis. A crossover gear set generally along the accessory gearbox axis interconnects a first gear set and a second gear set.

An accessory system for a gas turbine engine according to an exemplary aspect of the present disclosure includes an accessory gearbox which defines an accessory gearbox axis. A first gear set having a first drive gear and a first spur gear is mounted to a first shaft along a first accessory axis transverse to the accessory gearbox axis. A second gear set having a second drive gear and a second spur gear mounted to a second shaft along a second accessory axis transverse to the accessory gearbox axis, the second spur gear meshed with the first spur gear. A third gear set having a third drive gear and a third spur gear mounted to a third shaft along a third accessory axis transverse to the accessory gearbox axis. A fourth gear set having a fourth spur gear mounted to a fourth shaft along a fourth accessory axis transverse to the accessory gearbox axis, the fourth spur gear meshed with the third spur gear. A crossover gear set having a crossover drive gear mounted to a crossover shaft along the accessory gearbox axis, the crossover drive gear meshed with the first drive gear and the third drive gear.

A gas turbine engine according to an exemplary aspect of the present disclosure includes an engine case section defined about an engine axis of rotation. An accessory gearbox which defines an accessory gearbox axis parallel to the engine axis of rotation, the accessory gearbox mounted to said engine case section. A third accessory component mounted to the accessory gearbox along the accessory gearbox axis and transverse to a first accessory axis and a second accessory axis.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
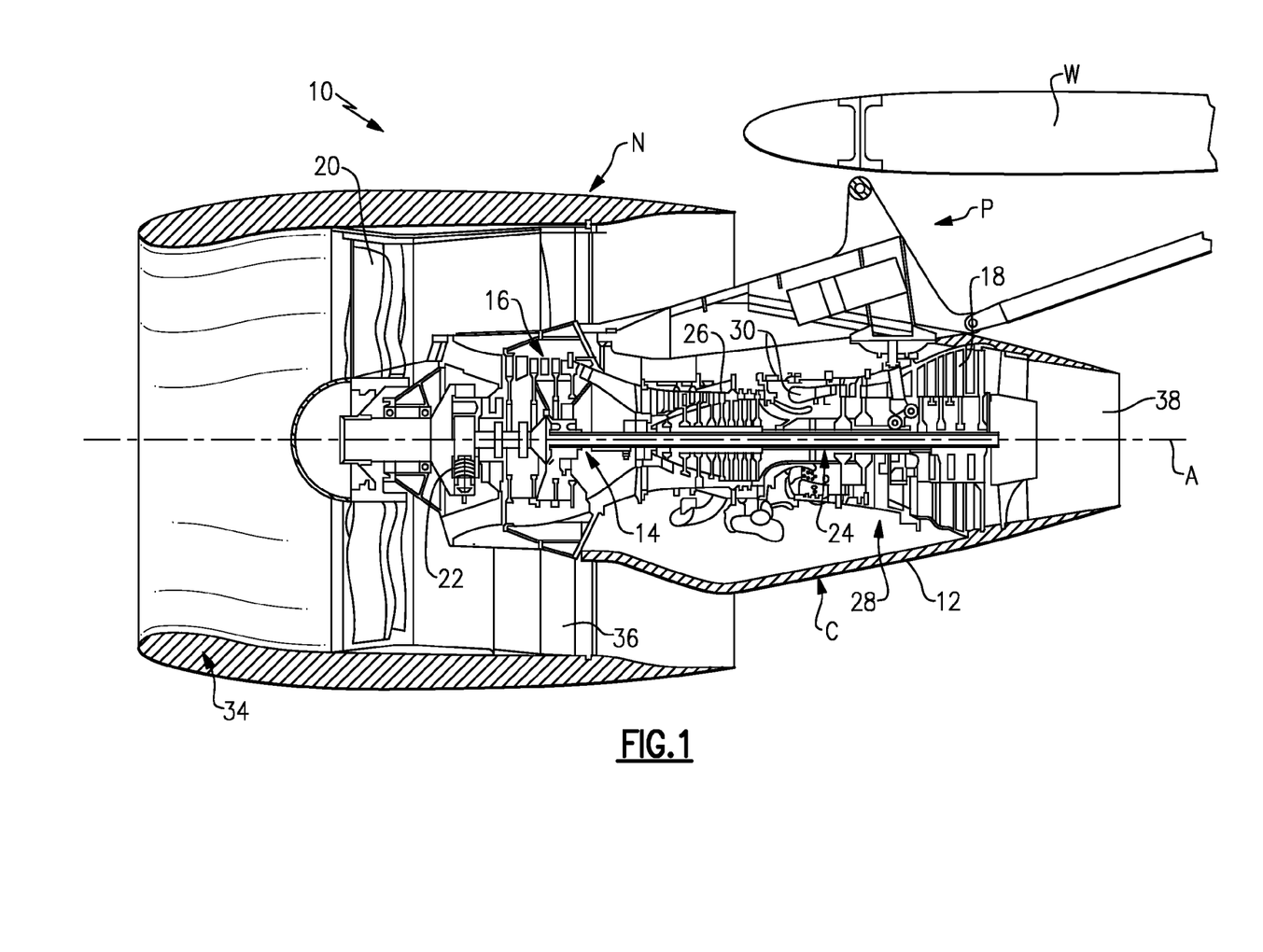
FIG. 1 is a general sectional view through a gas turbine engine along the engine longitudinal axis.

FIG. 1 illustrates a general partial fragmentary schematic view of a gas turbine engine 10 suspended from an engine pylori P within an engine nacelle assembly N as is typical of an aircraft designed for subsonic operation. The engine pylori P or other support structure is typically mounted to an aircraft wing W, however, the engine pylori P may alternatively extend from other aircraft structure such as an aircraft empennage.

The gas turbine engine 10 includes a core engine C within a core nacelle 12 that houses a low spool 14 and high spool 24. The low spool 14 includes a low pressure compressor 16 and low pressure turbine 18. The low spool 14 may drive a fan section 20 either directly or through a geared architecture 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in the disclosed embodiment is a high-bypass geared architecture aircraft engine. In one disclosed embodiment, the engine 10 bypass ratio is greater than ten (10:1), the turbofan diameter is significantly larger than that of the low pressure compressor 16, and the low pressure turbine 18 has a pressure ratio that is greater than 5:1. The geared architecture 22 may be an epicycle gear train such as a planetary gear system or other gear system with a gear reduction ratio of greater than 2.5:1. It should be understood, however, that the above parameters are only exemplary of one embodiment of a geared architecture engine and that the present application is applicable to other gas turbine engines including direct drive turbofans.

Airflow that enters a fan nacelle 34 generates a high bypass flow arrangement with a bypass ratio in which approximately 80 percent of the airflow which enters the fan nacelle 34 may be considered bypass flow. The bypass flow communicates through a generally annular bypass flow path defined between the core nacelle 12 and the fan nacelle 34. A portion of the airflow that enters the fan nacelle 34, referred to as a core airflow, is compressed by the low pressure compressor 16 and the high pressure compressor 26, mixed and burned with the fuel in the combustor 30, then expanded over the high pressure turbine 28 and low pressure turbine 18. The turbines 28, 18 are coupled for rotation with, respectively, spools 24, 14 to rotationally drive the compressors 26, 16 and, through the optional geared architecture 22, the fan section 20 in response to the expansion. A core engine exhaust exits the core nacelle 12 through a core nozzle 38 defined between the core nacelle 12 and a tail cone 32.

Figure 2:
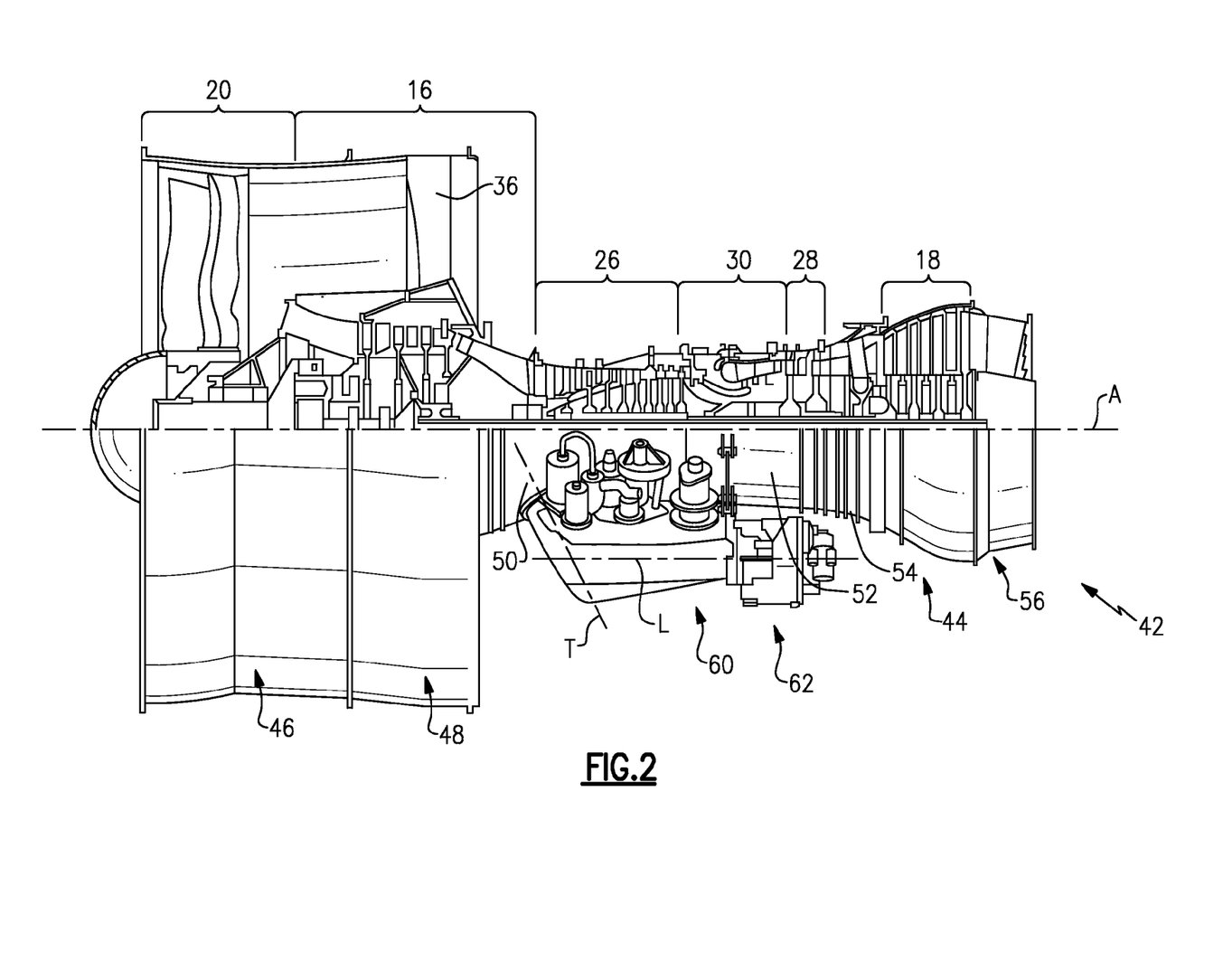
FIG. 2 is a general partial sectional view through a gas turbine engine along the engine longitudinal axis illustrating an engine static structure case arrangement on the lower half thereof with an accessory system mounted thereto.

Referring to FIG. 2, the engine static structure 42 includes core engine case structure 44 often referred to as an engine backbone. The engine case structure 44 generally includes sub-structures or modules, defined by, for example, a fan case 46, an intermediate case (IMC) 48, a high pressure compressor case 50, a diffuser case 52, a low pressure turbine case 54, and a turbine exhaust case 56. The core engine case structure 44 is secured to the fan case 46 at the IMC 48 which includes a multiple of circumferentially spaced radially extending fan exit guide vanes (FEGVs) 36.

Figure 3:
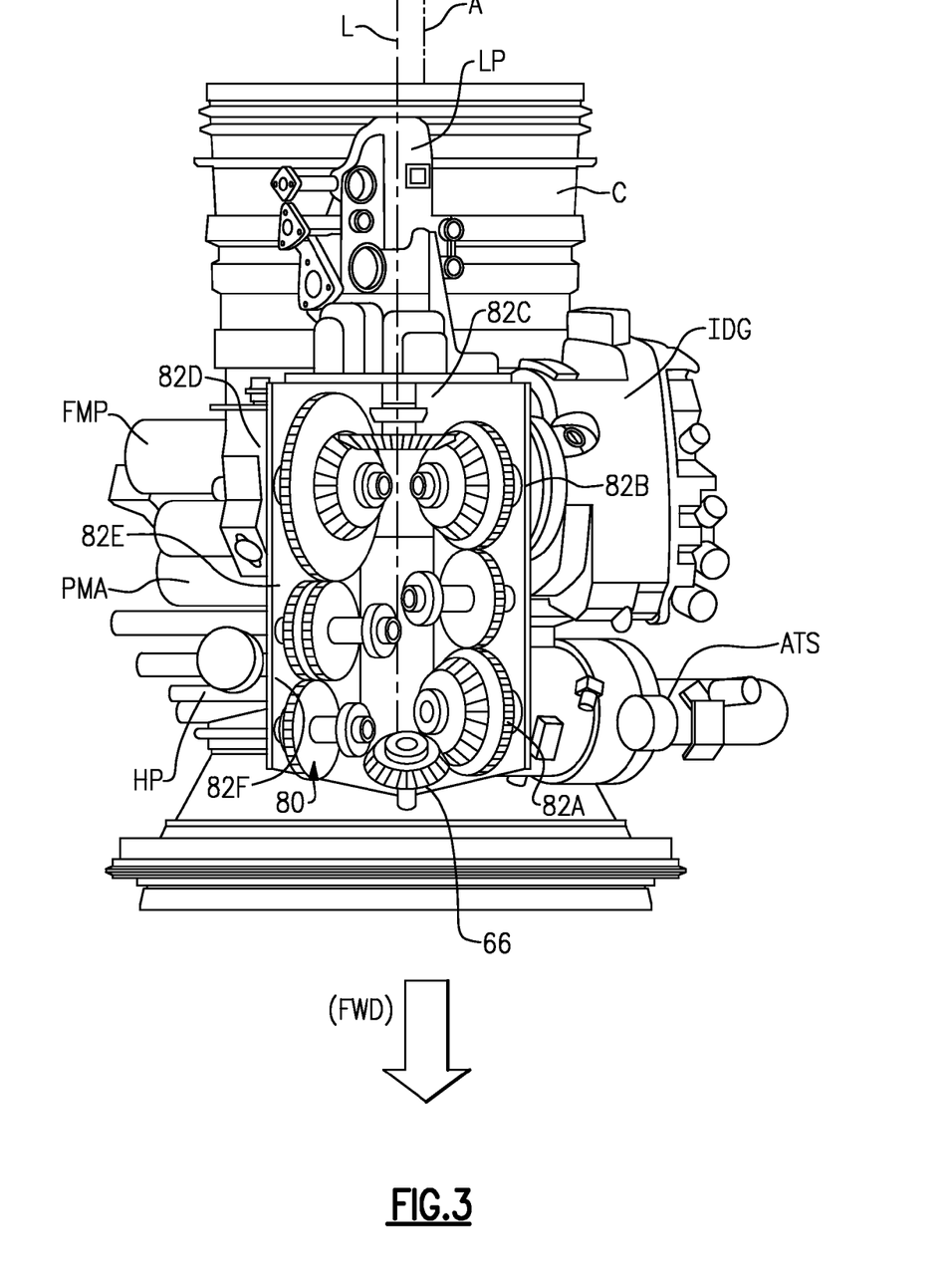
FIG. 3 is a general phantom bottom view of an accessory system with a multiple of accessory components mounted thereto.

An accessory system 60 is axially mounted to the case structure 44 along an accessory gearbox axis L generally parallel to the engine axis of rotation A. The accessory system 60 takes advantage of the significant axial area within the core nacelle C (FIG. 1) to support accessory components (ACs) such as, for example, an Air Turbine Starter (ATS), a deoiler (D), a hydraulic pump (HP), a lube pump (LP), an integrated drive generator (IDG), a permanent magnet alternator (PMA), a fuel pump module (FMP), and others transverse to the accessory gearbox axis L (FIG. 3). It should be understood, that any number and type of accessory components AC may alternatively or additionally be provided.

Figure 4:
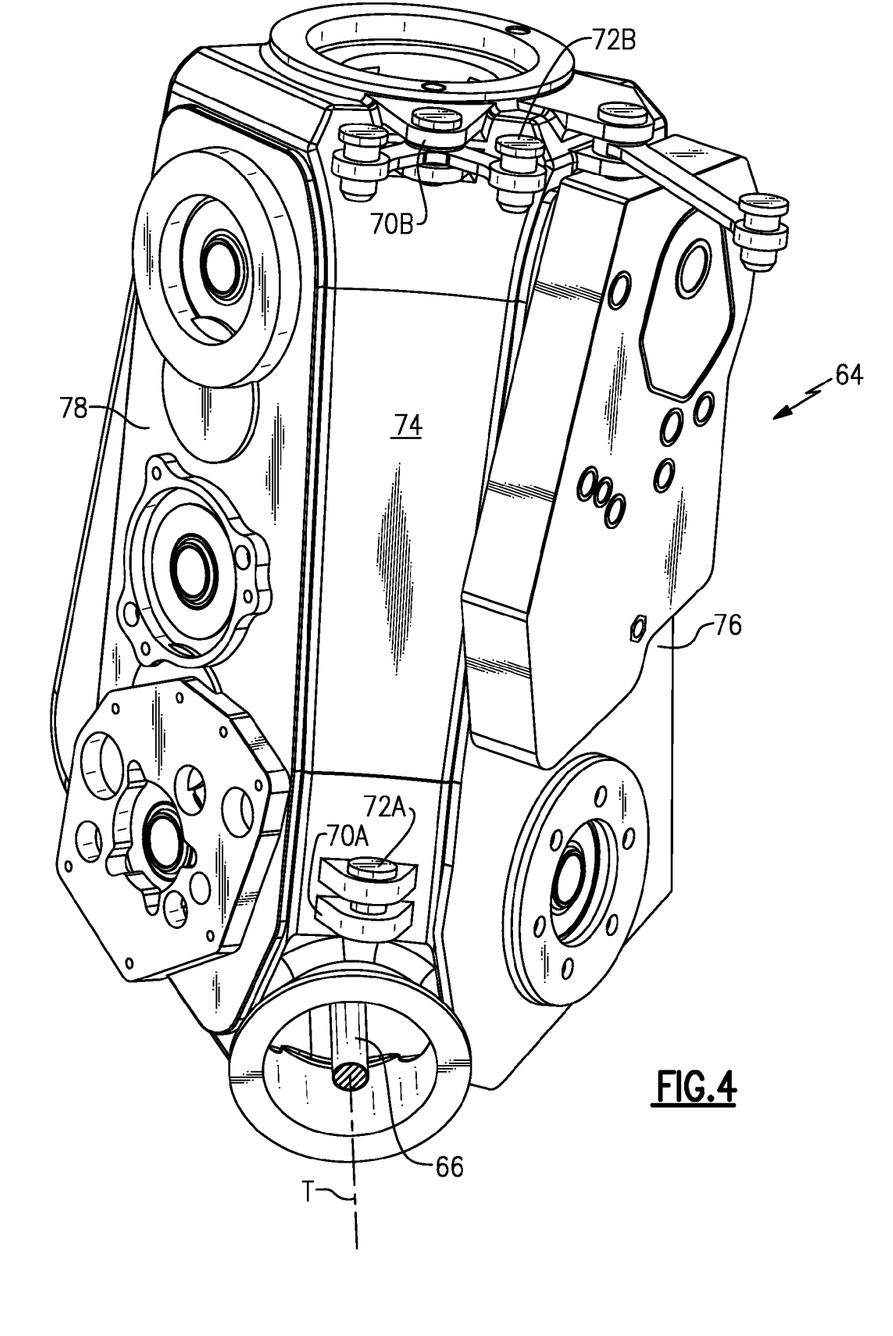
FIG. 4 is a perspective top view of the accessory system with a side cover removed without the multiple of accessory components mounted thereto.

With reference to FIG. 4, the accessory system 60 includes an axial housing assembly 64 which receives a towershaft 66. That is, the axial housing assembly 64 provides integral support for the towershaft 66 which otherwise conventionally required a separate angled gearbox housing which extends from the conventionally crescent shaped accessory gearbox. The towershaft 66 defines a towershaft axis of rotation T generally transverse to the engine axis of rotation A. It should be understood that the towershaft 66 is typically driven by the high spool 24. Various towershaft 66 arrangements will benefit herefrom.

The axial housing assembly 64 generally includes a main case 74, a cover 76 and a cover 78 opposite cover 76. The main case 74 may include support points 70A, 70B for attachment to the engine case structure 44 through a multiple of links 72A, 72B which constrain relative movement of the axial housing assembly 64 in six-degrees of freedom. It should be understood that various attachment arrangements may additionally or alternatively be provided.

Figure 5:
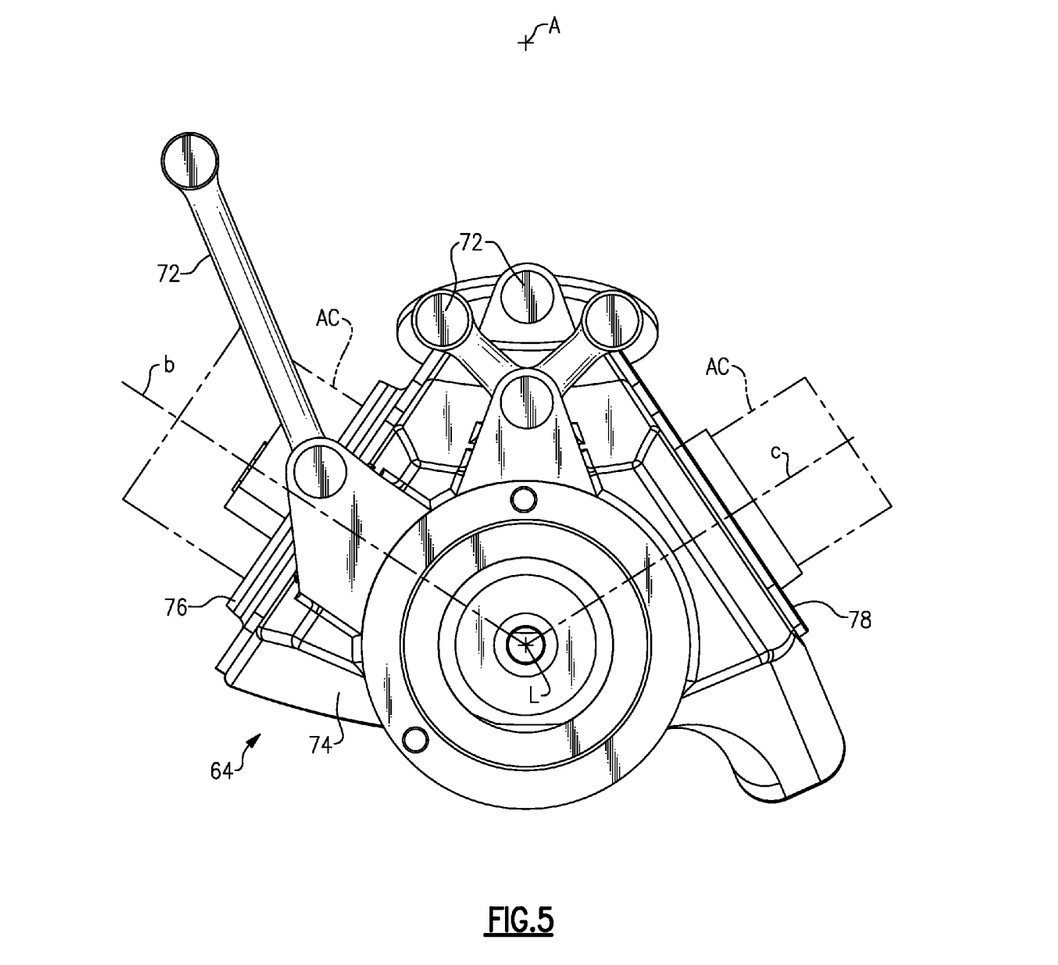
FIG. 5 is a perspective rear view of the accessory system without the multiple of accessory components mounted thereto.

With reference to FIG. 5, the covers 76, 78 define angled, non-parallel sides of the axial housing assembly 64. The covers 76, 78 are removable to access a geartrain 80 (FIG. 3). It should be understood that various covers and access panels may alternatively or additionally be provided.

Figure 6:
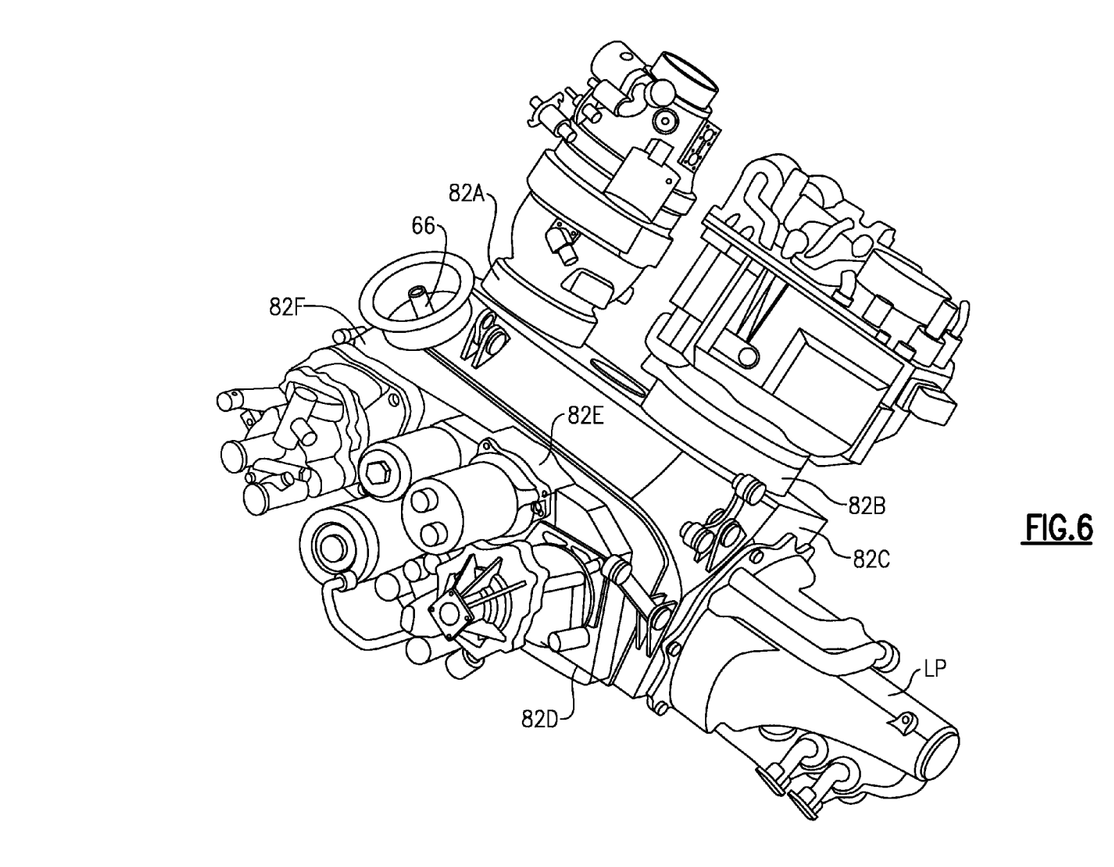
FIG. 6 is a perspective top view of an accessory system with the multiple of accessory components mounted thereto.

The covers 76, 78 define an accessory component pad 82A-82E to which each associated accessory component (AC) is mounted. The accessory component pads 82A-82E facilitate a V-orientation of the accessory components (AC) (FIG. 6) with respect to the main case 74 to essentially straddle the engine case structure 44. That is, a mounting axis b of each accessory component (AC) on cover 76 and a mounting axis c of each accessory component (AC) on cover 78 define the V-orientation with respect to the accessory gearbox axis L to straddle the engine axis of rotation A. This orientation provides a significant removability envelope for each accessory component (AC) as each accessory component (AC) extends in a radial outboard direction with regard to the accessory gearbox axis L.

Figure 7:
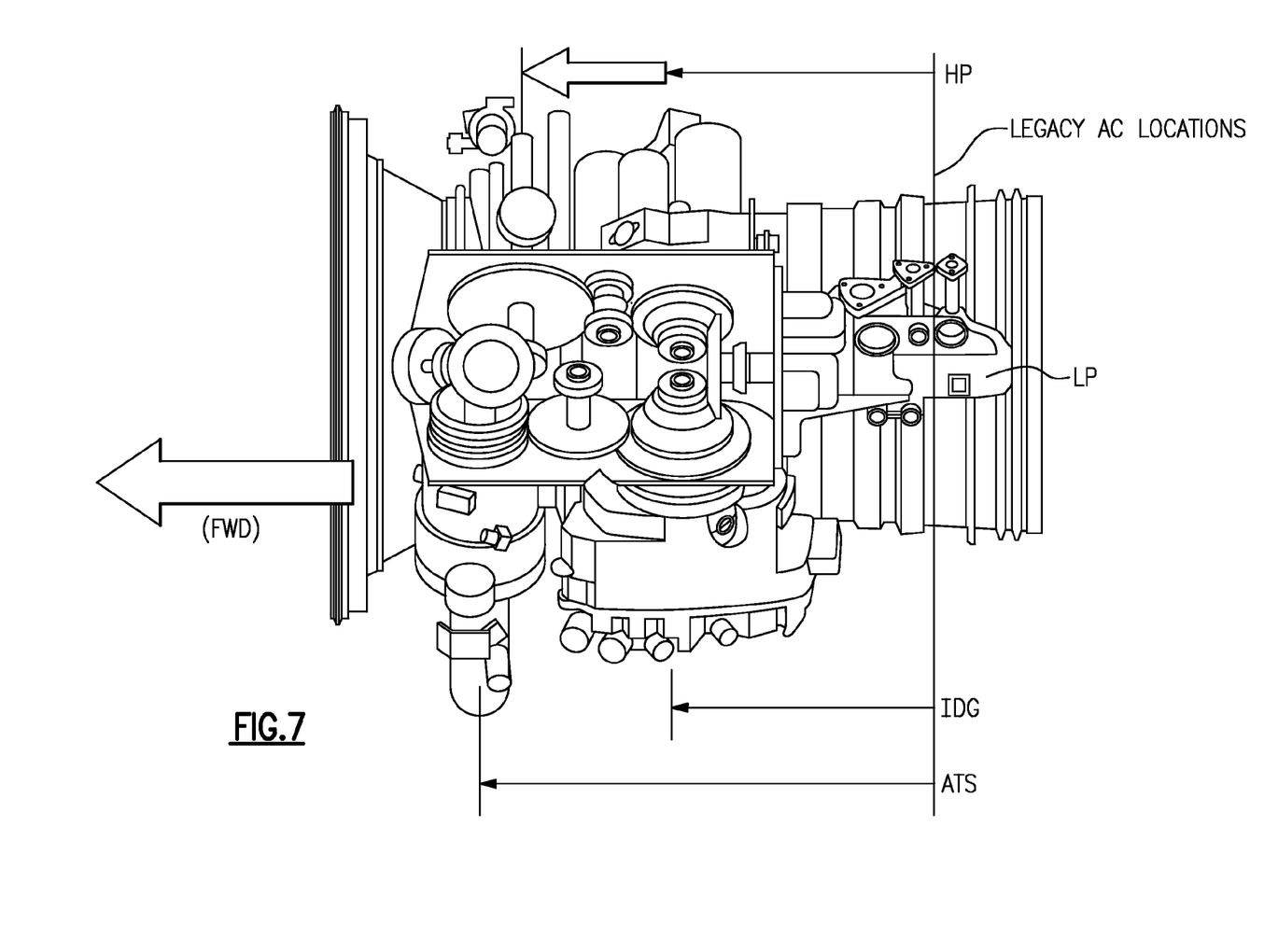
FIG. 7 is a schematic bottom view of an accessory system with a multiple of accessory components mounted thereto illustrating the accessory component position relative to legacy locations.

The accessory system 60 facilitates location of the accessory components (AC) forward within the core nacelle which provides a relatively lower temperature operating environment (FIG. 7). Reliability of the accessory components (ACs) is improved by an order of magnitude due to location in a cooler environment. The location of the accessory components (AC) also facilitates service line routes which typically require a relatively large bend radius. In one non-limiting embodiment, the lube pump (LP) is mounted along the accessory gearbox axis L. That is, the accessory gearbox axis L may be in line with the input axis of rotation for the lube pump (LP). The Air Turbine Starter (ATS) and the hydraulic pump (HP) are mounted in the forward most positions which provides the coolest environment for the accessory components.

Figure 8:
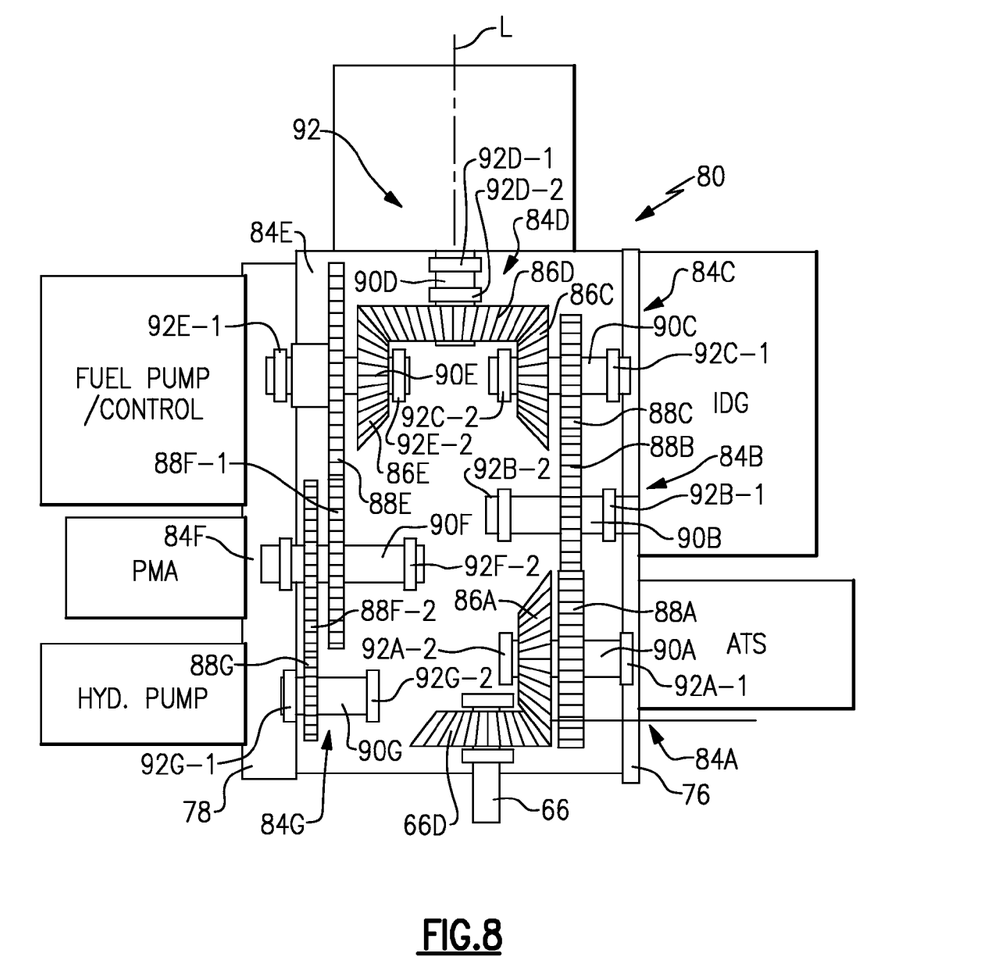
FIG. 8 is a schematic view of a gear train within the accessory system according to one non-limiting embodiment.

With reference to FIG. 8, the geartrain 80 defines a multiple of gear sets 84A-84G which may include respective drive gears 86A-86E, spur gears 88A-88G and shafts 90A-90G. It should be understood that although seven gear sets 84A-84G are illustrated in the disclosed, non-limiting embodiment, any number of gear sets will benefit herefrom.

The drive gears 86A-86E and spur gears 88A-88G may be keyed to the respective shafts 90A-90E for rotation therewith. The drive gears 86A-86E receive and transfer power from a gear 66D on the towershaft 66. Each drive gear 86A-86E may be a bevel gear mounted upon the respective shaft 90A-90E with a corresponding spur gear 88A-88G. The relative size of the spur gears 88A-88G drives each accessory component (AC) at the proper speed. The drive gears 86A-86E are relatively more expensive to manufacture and heavier than the spur gears 88A-88G such that their usage is minimized while the multitude of spur gears 88A-88E provide for the desired speed ratio between each accessory component (AC) with minimal weight and expense.

Each of the shafts 90A-90G may be supported within the axial housing assembly 64 upon a respective bearing set 92A-92G. One bearing of each bearing set 92A-92G may be located adjacent each end of the shaft 90A-90G such that the drive gears 86A-86E and/or spur gears 88A-88G are located therebetween. The shafts 90A-90C are located along respective mounting axes b of each accessory component AC on cover 76 while shafts 90E-90G are located along the mounting axes c of each respective accessory component AC on cover 78 to define the V-orientation with respect to the accessory gearbox axis L.

The accessory components (AC) adjacent cover 76 are interconnected with the accessory components adjacent cover 78 through a crossover gear set 92 generally along the accessory gearbox axis L which, in the disclosed non-limiting embodiment, drives the lube pump (LP) and is transverse to both axes b, c. Location of the lube pump (LP) generally along the accessory gearbox axis L facilitates scavenge flow. As is clear, tower shaft 66 drives the gear 86A. In turn, the gear 88B is driven through gear 88A, and drives the gear 88C. The gear 88C drives the gear 86C, which drives the crossover gear 86D. Gear 86D drives gear 89E, which in turn drives gear 88F-1 through the gear 88E. Finally, this drives the gear 88F-2, which drives gear 88G. The crossover gear 92 thus transfers rotation from one side of the accessory gearbox 80 (the side including the ATS and ITG in FIG. 8, to an opposed lateral side of the accessory gear box (the side including the fuel pump/control, the PMA and the HYD pump). The sides as described above are on opposed lateral sides of the rotational axis L of the crossover gear set.

The crossover gear set 92 includes a drive gear 86D in meshed engagement with drive gear 86C and 86E which respectively connect, in the disclosed non-limiting embodiment, the integrated drive generator (IDG), and the fuel pump module (FMP). The crossover gear set 92 avoids the heretofore necessity of a layshaft which thereby increases reliability and reduces gearbox size due to component shaft/bearing placement location nearer to accessory gearbox L. Typically, the higher power requirement accessory components (AC) such as the Air Turbine Starter (ATS) are located upstream relative the towershaft 66 and the lower power requirement accessory components (AC) such as the hydraulic pump (HP) are located further downstream.

In one non-limiting embodiment, the towershaft 66 drives a towershaft drive gear 66D that is in meshing engagement with the drive gear 86A of gear set 84A which, in the disclosed non limiting embodiment, drives the Air Turbine Starter (ATS). Gear set 84A drives gear set 84B through the meshed spur gears 88A, 88B. Gear set 84B may be considered an idler gear set which does not directly drive an accessory component but transfers power to gear set 84C and provides the desired gear ratio therebetween.

The crossover gear set 92—herein identified as gear set 84D—interconnects gear set 84C and gear set 84E. The drive gear 86D of the crossover gear set 92 is located outboard of the drive gears 86B, 86E to facilitate a relatively short shaft 90D which minimizes weight.

Figure 9:
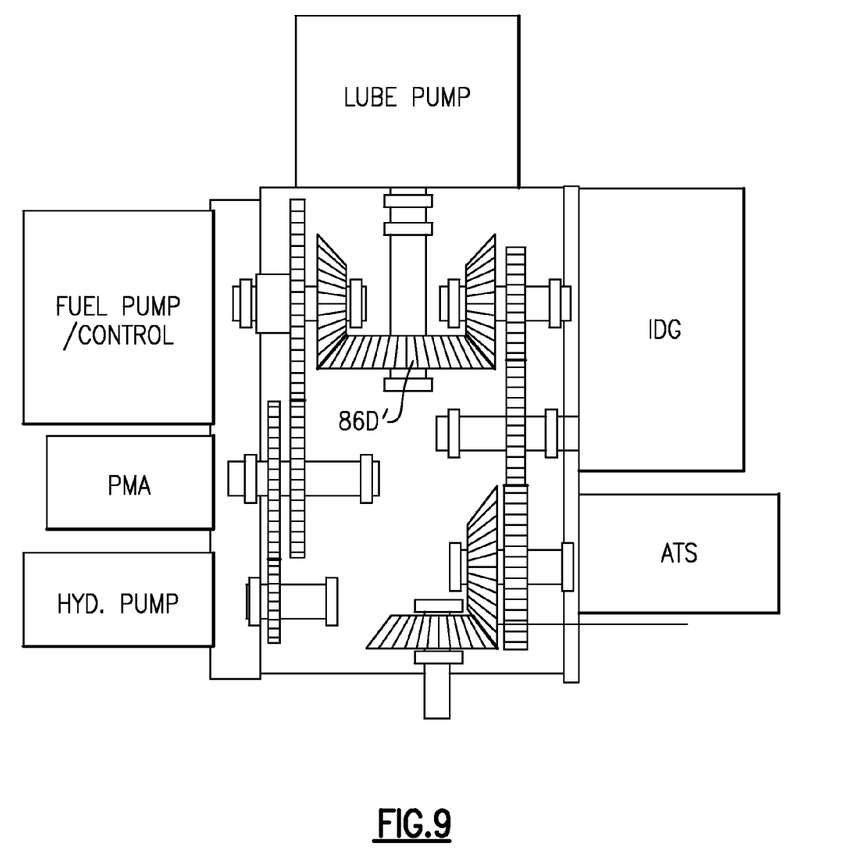
FIG. 9 is a schematic view of a gear train within the accessory system according to another non-limiting embodiment.

In an alternate embodiment (FIG. 9), the drive gear 86D' of the crossover gear set 92' is located inboard of drive gears 86C, 86E which results in a relatively longer shaft 90D' but facilitates balance of the overhung moment such as the relatively large lube pump (LP) through displacement of the bearing toward the center of the axial housing assembly 64.

Figure 10:
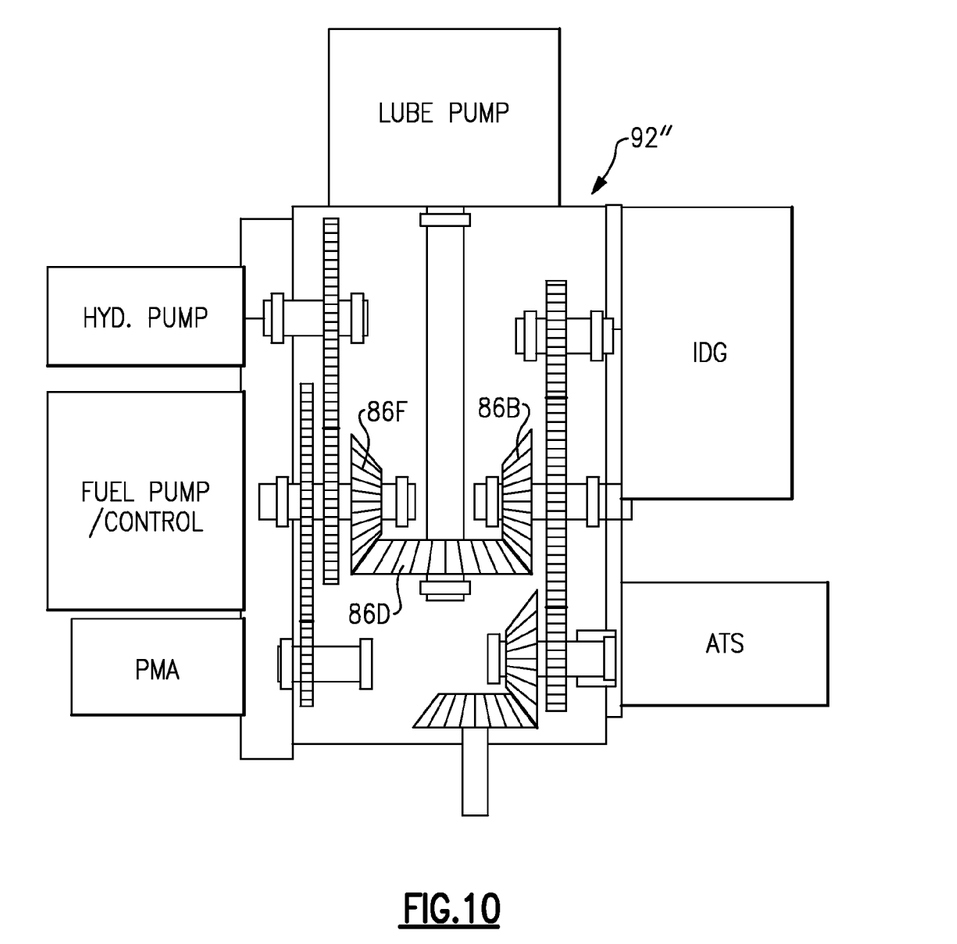
FIG. 10 is a schematic view of a gear train within the accessory system according to yet another non-limiting embodiment.

In yet another alternate embodiment (FIG. 10), drive gear 86D of the crossover gear set 92" is in meshing engagement with drive gears 86B, 86F which are located within the center of the geartrain 80. Such an arrangement may facilitate a particular center of gravity position, however, it should be understood that various other crossover gear set arrangements will benefit herefrom.

Drive gear 86D of gear set 84D which, in the disclosed non-limiting embodiment, drives the fuel pump module (FMP) and the deoiler (D), are collocated on the common shaft 90E. It should be understood that the deoiler (D) is located within the main case 74. The spur gear 88E of gear set 84E is in meshing engagement with the spur gear 88F of gear set 84F which, in turn, is in meshing engagement with the spur gear 88G of gear set 84G which respectively drive the permanent magnet alternator (PMA) and the hydraulic pump (HP). Gear set 84F may include multiple spur gears 88F-1, 88F-2 to provide the desired gear ratio change between gear set 84E and gear set 84G.

The accessory system 60 reduces component complexity, part count, and weight through elimination of bolted flanges and additional structure typical of a separate angled gearbox housing. This integration is best implemented for accessory gearboxes mounted close to the engine case, and in the case of this disclosure, gearboxes which are axially-oriented.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An accessory system for a gas turbine engine comprising:
   an accessory gearbox which defines an accessory gearbox axis;
   a first gear set within said accessory gearbox along a first accessory axis transverse to said accessory gearbox axis, an input towershaft for driving said first gear set;
   a second gear set within said accessory gearbox along a second accessory axis transverse to said accessory gearbox axis;
   a crossover gear set generally along said accessory gearbox axis, said crossover gear set interconnects said first gear set and said second gear set, said crossover gear set transmitting rotation from said first gear set to said second gear set.

2. The accessory system as recited in claim 1, wherein said accessory gearbox axis is parallel to a gas turbine engine axis of rotation.

3. The accessory system as recited in claim 1, wherein said first accessory axis is transverse to a gas turbine engine axis of rotation.

4. The accessory system as recited in claim 1, wherein said first accessory axis and said second accessory axis defines a V-orientation.

5. The accessory system as recited in claim 4, wherein said first accessory axis and said second accessory axis straddle a gas turbine engine axis of rotation.

6. The accessory system as recited in claim 5, further comprising a towershaft in meshing engagement with said first gear set.

7. The accessory system as recited in claim 1, wherein said first gear set drives a first accessory component removably mounted to a first removable cover of said accessory gearbox.

8. The accessory system as recited in claim 7, wherein said second gear set drives a second accessory component removably mounted to a second removable cover of said accessory gearbox.

9. The accessory system as recited in claim 8, wherein said crossover gear set drives a third accessory component removably mounted to a main case to which said first removable cover and said second removable cover are mountable.

10. The accessory system as recited in claim 9, wherein said third accessory component is a lube pump.

11. The accessory system as recited in claim 1, wherein said first gear set drives a first accessory component and said second gear set drives a second accessory component, said second accessory component requires less power than said first accessory component.

12. The accessory system as recited in claim 1, wherein said first gear set includes a first drive gear and a first spur gear mounted to a common shaft, said second gear set includes a second drive gear and a second spur gear mounted to a common shaft, said crossover gear set includes a crossover drive gear in meshing engagement with said first drive gear and said second drive gear.

13. The accessory system as recited in claim 12, wherein crossover drive gear, said first drive gear and said second drive gear are bevel gears.

14. An accessory system for a gas turbine engine comprising:
- an accessory gearbox which defines an accessory gearbox axis;
- a first gear set having a first drive gear and a first spur gear mounted to a first shaft along a first accessory axis transverse to said accessory gearbox axis;
- a second gear set having a second drive gear and a second spur gear mounted to a second shaft along a second accessory axis transverse to said accessory gearbox axis, said second spur gear meshed with said first spur gear;
- a third gear set having a third drive gear and a third spur gear mounted to a third shaft along a third accessory axis transverse to said accessory gearbox axis;
- a fourth gear set having a fourth spur gear mounted to a fourth shaft along a fourth accessory axis transverse to said accessory gearbox axis, said fourth spur gear meshed with said third spur gear;
- a crossover gear set having a crossover drive gear mounted to a crossover shaft along said accessory gearbox axis, said crossover drive gear meshed with said first second drive gear and said third drive gear; and
- a towershaft having a drive gear for driving said first gear set, and said crossover gear set receiving rotation from said second drive gear, and transmitting rotation to said third drive gear.

15. The accessory system as recited in claim 14, wherein said first accessory axis and said second accessory axis are contained within a first plane, said third accessory axis and said fourth accessory axis contained within a second plane, said first plane and said second plane defines a V-orientation.

16. A gas turbine engine comprising:
- an engine case section defined about an engine axis of rotation;
- an accessory gearbox which defines an accessory gearbox axis parallel to said engine axis of rotation, said accessory gearbox mounted to said engine case section;
- a first accessory component mountable to a first removable cover of said accessory gearbox along a first accessory axis;
- a second accessory component mounted to a second removable cover of said accessory gearbox along a second accessory axis, said first accessory axis and said second accessory axis defines a V-orientation;
- a third accessory component mounted to a main case of said accessory gearbox along said accessory gearbox axis and transverse to said first accessory axis and said second accessory axis; and
- a towershaft for rotating along said accessory gearbox axis, and for driving said first accessory component.

17. The gas turbine engine as recited in claim 16, wherein said first accessory axis and said second accessory axis straddle said engine case section.

18. The gas turbine engine as recited in claim 16, wherein said engine case section is an engine core case section.

19. The gas turbine engine as recited in claim 16, further comprising:
- a first gear set within said accessory gearbox along said first accessory axis transverse to said accessory gearbox axis, said first gear set operable to drive said first accessory component;
- a second gear set within said accessory gearbox along said second accessory axis transverse to said accessory gearbox axis, said second gear set operable to drive said second accessory component; and
- a crossover gear set generally along said accessory gearbox axis, said crossover gear set interconnects said first gear set and said second gear set, said crossover gear set operable to drive said third accessory component.

20. The accessory system as recited in claim 1, wherein said crossover gear set rotating about a crossover gear set axis, with said first gear set being positioned on one lateral side of said crossover gear axis, and said second gear set being positioned on an opposed side of said crossover gear axis.

21. The accessory system as recited in claim 14, wherein said crossover gear set rotating about a crossover gear set axis, with said first and second gear sets being positioned on one lateral side of said crossover gear axis, and said third and fourth second gear sets being positioned on an opposed side of said crossover gear axis.

* * * * *